(12) United States Patent
Wigren et al.

(10) Patent No.: US 10,999,185 B2
(45) Date of Patent: May 4, 2021

(54) WIRELESS-SYSTEM FLOW CONTROL AND PACKET SCHEDULER INTERFACE

(71) Applicant: TELEFONAKTIEBOLAGET LM ERICSSON (PUBL), Stockholm (SE)

(72) Inventors: Torbjörn Wigren, Uppsala (SE); Murali Krishna Srinivasan, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/301,030

(22) PCT Filed: May 30, 2016

(86) PCT No.: PCT/SE2016/050496
§ 371 (c)(1),
(2) Date: Nov. 13, 2018

(87) PCT Pub. No.: WO2017/209661
PCT Pub. Date: Dec. 7, 2017

(65) Prior Publication Data
US 2019/0182147 A1    Jun. 13, 2019

(51) Int. Cl.
*H04L 12/707* (2013.01)
*H04L 12/26* (2006.01)
(Continued)

(52) U.S. Cl.
CPC .............. *H04L 45/24* (2013.01); *H04L 43/00* (2013.01); *H04L 43/0817* (2013.01);
(Continued)

(58) Field of Classification Search
CPC ...... H04L 47/30; H04L 47/726; H04L 47/781
See application file for complete search history.

(56) References Cited

U.S. PATENT DOCUMENTS

| | | | | |
|---|---|---|---|---|
| 2012/0163205 | A1* | 6/2012 | Zhang | H04W 72/1247 370/252 |
| 2014/0376609 | A1 | 12/2014 | Barkley et al. | |
| 2016/0135075 | A1* | 5/2016 | Wigren | H04W 28/12 370/235 |

FOREIGN PATENT DOCUMENTS

| | | |
|---|---|---|
| WO | 2013167647 A1 | 11/2013 |
| WO | 2014207494 A1 | 12/2014 |

OTHER PUBLICATIONS

Torbjörn Wigren, "Robust L2 Stable Networked Control of Wireless Packet Queues in Delayed Internet Connections", IEEE Transactions on Control Systems Techonology, Mar. 2016, vol. 24, No. 2.
(Continued)

*Primary Examiner* — Pao Sinkantarakorn
(74) *Attorney, Agent, or Firm* — Patent Portfolio Builders PLLC

(57) ABSTRACT

A method for multi-path packet scheduling in a wireless communication system comprises collecting of measurements of queue state information about buffers of a plurality of transmit nodes. A rate budget is calculated based on the collected measurements of queue state information. The rate budget comprises commanded bit rates and/or data volumes for each transmit node for a subsequent sampling period. Data representative for the rate budget is provided from the packet-flow controller node over a packet scheduling interface to a packet scheduler node. Packets to be sent to each of the plurality of transmit nodes in a subsequent sampling period are scheduled depending on the received rate budget. Nodes for multi-path packet scheduling in a wireless communication system are also disclosed.

14 Claims, 13 Drawing Sheets

(51) Int. Cl.
*H04L 12/873* (2013.01)
*H04W 28/02* (2009.01)
*H04L 12/875* (2013.01)
*H04L 12/863* (2013.01)
*H04W 28/10* (2009.01)
*H04W 72/12* (2009.01)

(52) U.S. Cl.
CPC ............ *H04L 47/522* (2013.01); *H04L 47/56* (2013.01); *H04L 47/6255* (2013.01); *H04W 28/0205* (2013.01); *H04W 28/10* (2013.01); *H04W 72/1252* (2013.01)

(56) References Cited

OTHER PUBLICATIONS

International Search Report and Written Opinion, dated Jul. 28, 2016, from corresponding PCT Application No. PCT/SE2016/050496.

* cited by examiner

WIRELESS-SYSTEM FLOW CONTROL AND PACKET SCHEDULER INTERFACE

TECHNICAL FIELD

The proposed technology generally relates to packet handling in multi-point transmission wireless communication systems

BACKGROUND

Today's wireless cellular systems have been designed to handle very efficient data transfer between a single user equipment (UE) and a single base station, denoted eNB in fourth generation cellular (4G) systems. These solutions are sufficient at today's carrier frequencies close to 1-2 GHz. In future fifth generation cellular system (5G) a shift towards higher carrier frequencies is a necessity, to be able to utilize the available spectrum, thereby achieving a higher capacity.

A consequence of the move to higher carrier frequencies is that the radio propagation is transformed from "diffuse" scattering to more beamlike propagation. This leads to sharp diffraction effects and increasingly heavy radio shadowing behind obstacles. In turn this makes it more difficult to obtain a uniform coverage from a single 5G base station (denoted eNB in case of Long Term Evolution (LTE) and (Next generation Radio) NR in case of the new access discussed for 5G at higher carrier frequencies). The implication is a need to transmit from multiple not co-located transmit points to cover a single cell. Such massive multi-point transmission is generally considered to become a cornerstone in future 5G radio access.

It should be noted that multi-point transmission is also considered for the present 4G LTE system, however the need and also the massiveness of the solutions for 4G are believed to be less than those of future 5G cellular systems.

In a massive multi-point transmission system, where data is arriving from uplink nodes, each involved transmit point needs to be given access to (portions of) this data, for transmission over the wireless interface. It is the task of the flow control functionality to perform the data transfer between different nodes and temporary storage buffers.

In many applications the data is closely related to data simultaneously being transmitted from other transmit points. This is e.g. the case for streaming video, in which case the data for a specific part of the video are needed at the same time, to within a certain pre-determined margin, in the receiving UE. It should here be noted that the different transmit points may transmit different data, or the same data for diversity gain, or a mix of these alternatives.

The radio link variations and hence the delay variations are likely to increase for higher 5G carrier frequencies, due to the increasing radio shadowing. Small timing errors between packets received are automatically handled by the protocols applied which reorder the packets to resynchronize and create the correct data sequence. However, if the asynchronism is too large, the protocols will register this as an error, and request retransmission of packets. In some protocol implementations, this may cause retransmission of out of sequence packets already received, as well as packets still in flight. This will then affect the user experience in a negative way, causing e.g. the streaming video to display erroneously.

The packet scheduler may have several tasks. It typically operates on a set of packet queues, where each packet queue may, at least sometimes, be thought of as corresponding to one bearer. These queues may be virtual and derived from one or several physical queues.

In the article "Robust $\mathcal{L}_2$ Stable Networked Control of Wireless Packet Queues in Delayed Internet Connections" by T. Wigren, in IEEE Transactions on control systems technology, Vol. 24, No. 2, March 2016, pp. 502-513, a networked controller for packet data queue level control between two nodes with an Internet connection is presented. The control signal is the bitrate from the transmitting node over the Internet connection in between to the receiving node in which the controlled queue is located.

In the published international patent application WO 2014/207494 A1, methods and apparatuses for recovering data packet flow control against radio base station buffer run away are disclosed.

In the published international patent application WO 2013/167647 A1, a flow control mechanism is provided that is usable for a multiflow communication. A radio network controller (RNC) sends to the Node Bs involved in the multiflow communication a target buffer delay value determined by the RNC. The Node Bs use the target buffer delay value for determining a target buffer size which is signaled to the RNC for flow control purposes.

This approach is based on a simple timing mechanism of each transmission path separately for flow control. Although giving some reduction in the amount of retransmissions, the approach is relatively insensitive to variations in conditions. The tool is based on measurement signaling between each Node B and the RNC and is thus not capable of fast adapting to a current configuration of transmission paths and a current traffic situation. Furthermore, asynchronism for packet reception in the UE cannot be addressed with high accuracy.

A problem with existing solutions in prior art is that there is no packet scheduling algorithm being responsive to the momentary wireless capacity connecting each of the transmission points to the UE. Furthermore, there is a lack of responsiveness also to asynchronism for packet reception in the UE.

SUMMARY

It is an object to provide methods and apparatuses that provide packet scheduling algorithms being responsive to momentary wireless capacity.

This and other objects are met by embodiments of the proposed technology.

In general words, according to a first aspect, there is provided a method for multi-path packet scheduling in a wireless communication system. The method comprises collection of measurements of queue state information about buffers of a plurality of transmit nodes. In a packet-flow controller node, a rate budget based on the collected measurements of queue state information is calculated. The rate budget comprises commanded bit rates and/or data volumes for each transmit node for a subsequent sampling period. Data representative for the rate budget is provided from the packet-flow controller node over a packet scheduling interface to a packet scheduler node. In the packet scheduler node, packets to be sent to each of the plurality of transmit nodes in a subsequent sampling period are scheduled depending on the received rate budget.

According to a second aspect, there is provided a method for assisting multi-path packet scheduling in a wireless communication system. The method comprises collection of measurements of queue state information about buffers of a plurality of transmit nodes. In a packet-flow controller node, a rate budget is calculated based on the collected measurements of queue state information. The rate budget comprises commanded bit rates and/or data volumes for each transmit node for a subsequent sampling period. Providing of data representative for the rate budget from the packet-flow controller node over a packet scheduling interface to a packet scheduler node is initiated for enabling scheduling of packets to be sent to each of the plurality of transmit nodes in a subsequent sampling period depending on the rate budget.

According to a third aspect, there is provided a method for multi-path packet scheduling in a wireless communication system. The method comprises receiving, in a packet scheduler node, of data representative for a rate budget over a packet scheduling interface. The rate budget comprises commanded bit rates and/or data volumes for each transmit node for a subsequent sampling period. In the packet scheduler node, packets to be sent to each of a plurality of transmit nodes in a subsequent sampling period are scheduled depending on the received rate budget.

According to a fourth aspect, there is provided a packet-flow controller node configured to assist scheduling of packets in multi-paths in a wireless communication system. The packet-flow controller node is configured to collect measurements of queue state information about buffers of a plurality of transmit nodes. The packet-flow controller node is further configured to calculate a rate budget based on the collected measurements of queue state information. The rate budget comprises commanded bit rates and/or data volumes for each transmit node for a subsequent sampling period. The packet-flow controller node is further configured to initiate providing of data representative for the rate budget from the packet-flow controller node over a packet scheduling interface to a packet scheduler node for enabling scheduling of packets to be sent to each of the plurality of transmit nodes in a subsequent sampling period depending on the rate budget.

According to a fifth aspect, there is provided a packet scheduler node configured to schedule packets in multi-paths in a wireless communication system. The packet scheduler node is configured to receive data representative for a rate budget over a packet scheduling interface. The rate budget comprises commanded bit rates and/or data volumes for each transmit node for a subsequent sampling period. The packet scheduler node is further configured to schedule packets to be sent to each of a plurality of transmit nodes in a subsequent sampling period depending on the received rate budget.

According to a sixth aspect, there is provided a wireless communication system comprising a packet-flow controller node according to the fourth aspect, a packet scheduler node according to the fifth aspect and a packet scheduling interface connecting the packet-flow controller node and the packet scheduler node.

According to a seventh aspect, there is provided a computer program comprising instructions, which when executed by at least one processor, cause the processor(s) to collect measurements of queue state information about buffers of a plurality of transmit nodes. The instructions, which when executed by the processor(s), cause the processor(s) further to calculate a rate budget based on the collected measurements of queue state information. The rate budget comprises commanded bit rates and/or data volumes for each transmit node for a subsequent sampling period. The instructions, which when executed by the processor(s), cause the processor(s) further to initiate providing of data representative for the rate budget from the packet-flow controller node over a packet scheduling interface to a packet scheduler node for enabling scheduling of packets to be sent to each of the plurality of transmit nodes in a subsequent sampling period depending on the rate budget.

According to an eighth aspect, there is provided a computer program comprising instructions, which when executed by at least one processor, cause the processor(s) to receive data representative for a rate budget over a packet scheduling interface. The rate budget comprises commanded bit rates and/or data volumes for each transmit node for a subsequent sampling period. The instructions, which when executed by the processor(s), cause the processor(s) further to schedule packets to be sent to each of a plurality of transmit nodes in a subsequent sampling period depending on the received rate budget.

According to a ninth aspect, there is provided a computer-program product comprising a computer-readable medium having stored thereon a computer program according to the seventh or eighth aspect.

According to a tenth aspect, there is provided a carrier comprising the computer program of the ninth aspect, wherein the carrier is one of an electronic signal, an optical signal, an electromagnetic signal, a magnetic signal, an electric signal, a radio signal, a microwave signal, or a computer-readable storage medium.

According to an eleventh aspect, there is provided a packet-flow controller node for assisting in scheduling of packets in multi-paths in a wireless communication system. The packet-flow controller node comprises a collecting module for collection of measurements of queue state information about buffers of a plurality of transmit nodes. The packet-flow controller node further comprises a calculator for calculating a rate budget based on the collected measurements of queue state information. The rate budget comprising commanded bit rates and/or data volumes for each transmit node for a subsequent sampling period. The packet-flow controller node further comprises a transmitter for initiating providing of data representative for the rate budget from the packet-flow controller node over a packet scheduling interface to a packet scheduler node for enabling scheduling of packets to be sent to each of the plurality of transmit nodes in a subsequent sampling period depending on the rate budget.

According to a twelfth aspect, there is provided a packet scheduler node for scheduling packets in multi-paths in a wireless communication system. The packet scheduler node comprises a receiver for receiving data representative for a rate budget over a packet scheduling interface. The rate budget comprises commanded bit rates and/or data volumes for each transmit node for a subsequent sampling period. The packet scheduler node further comprises a scheduling module for scheduling packets to be sent to each of a plurality of transmit nodes in a subsequent sampling period depending on received the rate budget.

According to a thirteenth aspect, there is provided a wireless communication system comprising a packet-flow controller node according to the eleventh aspect, a packet scheduler node according to the twelfth aspect and a packet scheduling interface connecting the packet-flow controller node and the packet scheduler node.

An advantage of the proposed technology is that an interface is provided between a multi-path packet flow controller and a packet scheduler. The interface presents the packet scheduler with a momentary bit-rate or packet volume budget, for the coming scheduling period. Thereby, an implementation of the multi-path packet flow controller and the packet scheduler in separate logical and/or physical nodes is allowed. This provides almost complete decoupling between the two functions, thereby providing a maximal flexibility for selection of packet scheduling nodes, at the same time as new stringent requirements on e.g. latency for critical machine type communication. Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of the multi-point transmission approach.

Figure 1:
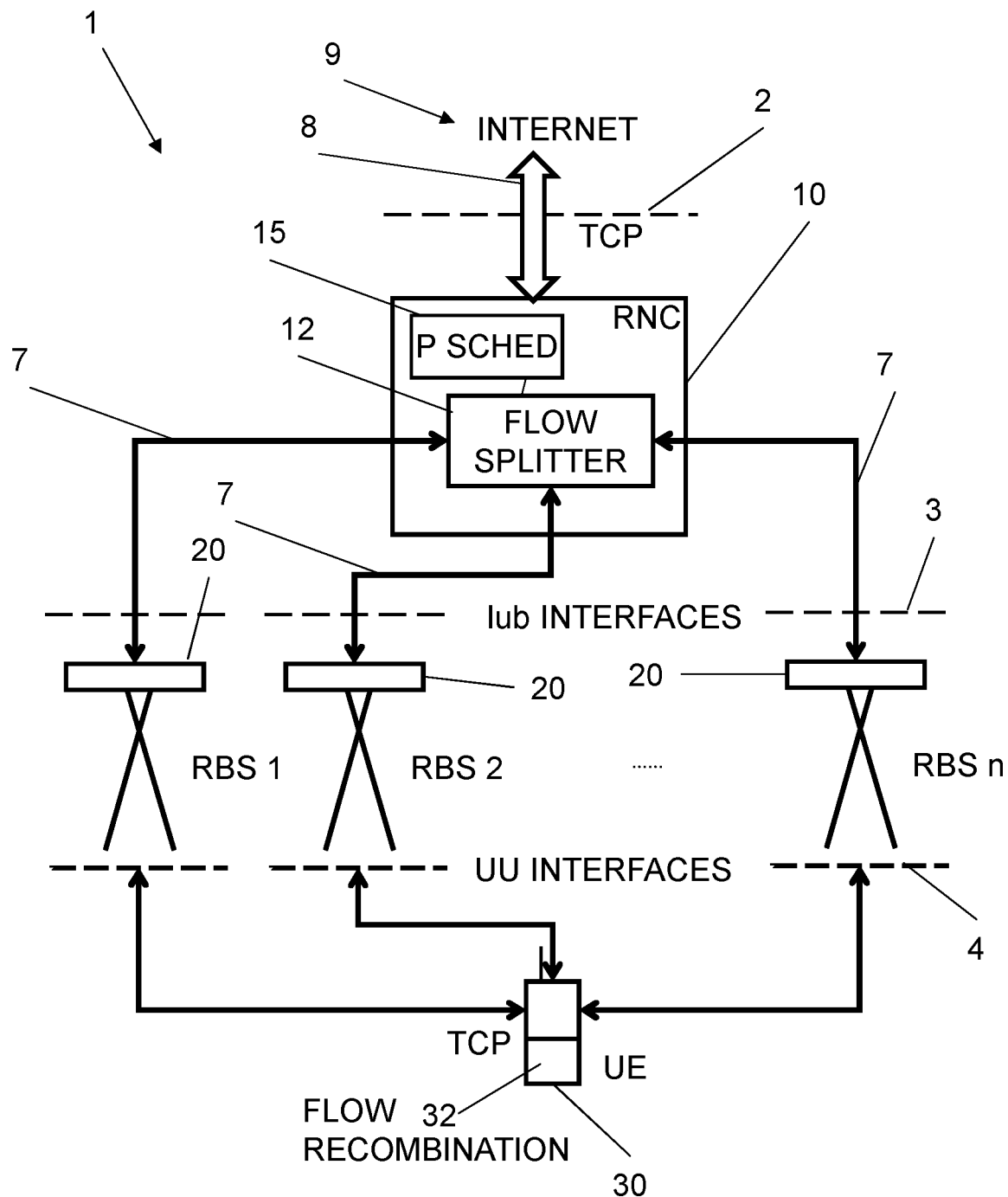
FIG. 1 is a block diagram of an example of a communication system utilizing multi-point transmission.

One mechanism for achieving multi-point transmission is illustrated in FIG. 1 depicts an architecture of a communication system 1, in this particular illustration the existing prior art 3G Wideband Code Division Multiple Access (WCDMA) system. Similar architectures in 4G and 5G could involve nodes from both the radio access network (RAN) and the core network (CN).

Data 8 from the Internet 9 is received over a Transmission Control Protocol (TCP) interface 2 by a flow splitter 12 of a Radio Network Controller (RNC) 10. This data 8 will in the best case be an ordered set of packets that need to be transmitted to a UE 30. The data 8 is split by the flow splitter 12 into a number of individual flows 7 of packets, provided to a multitude of transmit nodes 20, typically Radio Base Stations (RBS), e.g. NodeBs, over an Iub Interface 3. The RBSs 20 transmits the packets by radio signals over UU interfaces 4 to the UE 30.

In the UE 30, a recombiner 32 performs a flow recombination. However, due to non-uniform and varying delays in the individual flows 7, the packets received by the UE 30 will in general be out of order. The delay variations that cause the out-of-ordering may be the result of:

Varying queuing delays in the RBS,

Varying transport network delays, e.g. due to congestion, and/or

Varying radio link quality, causing RBS buffer size variation.

A first task of a packet scheduler 15 is to determine the amount of packets from the packet queue of the data 8 that are to be sent on at the present time, at each output of the flow splitter 12. Here, so-called rate shaping may be used, meaning that the packets are sent over a specified time interval with a selected bit rate or packet rate. A motivation for this is provided by information theory, where Shannon's famous result proves that every channel is associated with a maximum rate that allows error free data transfer.

The packet scheduler 15 may also decide, or use external decisions, on the priority path of certain types or classes of packets. It may e.g. always schedule high priority packets via the packet path with the lowest latency to the end user. The packet scheduler 15 may also decide, or use decisions, on diversity transmission, thereby duplicating a packet and scheduling multiple packet copies over several different flows 7. This of course increases the chances of error free reception of the information of said duplicated package, at the receiving end. Diversity transmission could also be achieved over one path, by scheduling copies of the same packets over the same path, but at different times. The chances of good channel conditions for at least one copy of said duplicated packet thereby increases, which in turn increases the probability of correct reception of the information of the duplicated package at the receiving end.

It is stressed that it is the package scheduler 15 that is responsible for the transmission of packets from the (possibly virtual) node where it resides, in this particular example the RNC 10.

The basics of the automatic control terminology used in the present disclosure are explained in Appendix A. It is stressed that this terminology is part of the prior art in the field of automatic control.

A first problem with existing solutions in prior art is that there is no packet scheduling algorithm and/or related interface that is responsive to the preferred momentary data rate of each transmission path when multi point transmission is used. Such momentary preferred data rate is strongly dependent on the momentary wireless capacity connecting each of the transmission points to the UE. Such momentary preferred data rate may also be a function of the downlink backhaul delay over each packet path and the dwell time of the queue of each transmit node.

A second problem with existing solutions in the prior art is that there is no packet scheduling interface and/or related interface that is responsive to asynchronism, directly or indirectly, for packet reception in the UE, between packets that are time aligned in the packet scheduler, but sent over different packet paths to the UE.

In order to address such problems or requests, a new input interface can be introduced. This packet scheduling interface, is associated with a packet scheduler for multi-point transmission. The packet scheduler receives, via the packet scheduling interface, momentary packet scheduling information valid for a certain sampling period. This information is preferably provided from a time skew packet flow control algorithm. The packet scheduling interface is characterized by packet scheduling information that consists of bit rates for each packet path, bits to be scheduled during the next sampling period for each packet path, or a combination thereof. In other words, a rate budget is presented to the packet scheduler, over the new packet scheduling interface.

Figure 3:
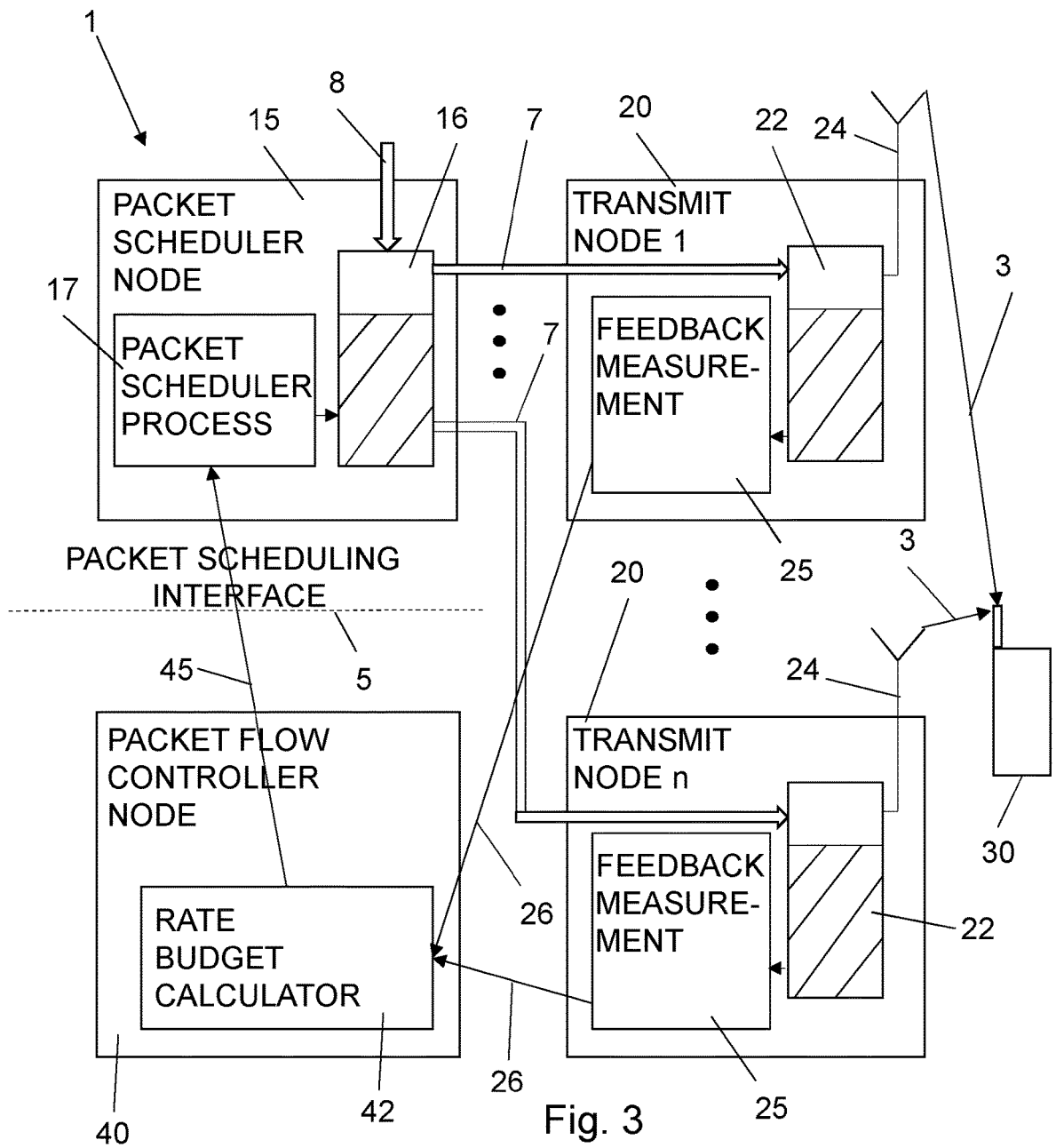
FIG. 3 is a block diagram of an embodiment of a communication system utilizing multi-point transmission.

FIG. 3 is a block diagram of one embodiment of an overall node architecture relating to these ideas. There the end user, i.e. the UE 30 is connected to n transmit nodes 20, where each transmit node 20 sends by a transmitter 24 data 3 over a separate wireless interface. These interfaces may or may not be of the same type. They may e.g. comprise any mix of LTE, NR and WIFI type wireless interfaces where LTE denotes the current 4G 3GPP standard, NR denotes any new 5G 3GPP standard and WIFI denotes any of the current 4G or future 5G IEEE standards. Each transmit node 20 is equipped with a transmit queue or buffer 22 for buffering to handle the radio fading. The transmit nodes 20 also, in a feedback measurement section 25, continuously measure feedback information 26 relating to the queue state information (data volume stored in the transmit queue, packet dwell time for data passing the transmit queue, or the latest acknowledged packet sequence number as received back from the UE) of the buffer 22. To utilize the latest acknowledged packet sequence number for computation of a rate budget for control of the dwell time of the transmit queue requires that the downlink (DL) backhaul delay and the uplink (UL) backhaul delay is known and preferably also the air interface and UE delay.

The feedback information 26 may also comprise the momentary wireless data rate and the DL backhaul latency. The UL backhaul latency can be derived in the packet flow controller node from time stamps, assuming a certain degree of synchronism between nodes. The feedback information 26 is sent to a packet flow controller node 40, preferably based on time skew. There, it is combined in a rate budget calculator 42, i.e. in a packet scheduler information calculation block. The result, the rate budget 45, comprises commanded bit rates and/or data volumes for each transmit node for a subsequent sampling period. The rate budget 45 is sent over a new disclosed packet scheduling interface 5 to the packet scheduler node 15. There it is used in a packet scheduler process 17 for packet scheduling as described further below. The scheduled packets are then sent from a packet scheduler buffer 16 over the selected packet path 7 to the transmit nodes 20.

All the above nodes may be part of one or several physical nodes. Typically the transmit nodes 20 may comprise base stations or radio heads in distributed antenna solutions (DAS), while the packet scheduler node 15 and packet flow controller node 40 may be incorporated in base stations or other radio access network nodes or core network nodes.

As used herein, the non-limiting terms "User Equipment (UE)", "station (STA)" and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs, or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

As used herein, the term "network device" may refer to any device located in connection with a communication network, including but not limited to devices in access networks, core networks and similar network structures. The term network device may also encompass cloud-based network devices.

A new packet scheduler process is consequently presented, responsive to the packet scheduling information, i.e. the rate budget, received over the packet scheduling interface from the packet flow control node. The packet scheduling process is characterized by the property that it schedules packets in a way that follows the packet scheduling information received over the packet scheduling interface whenever there are enough packets in the packet scheduler buffer.

Figure 4:
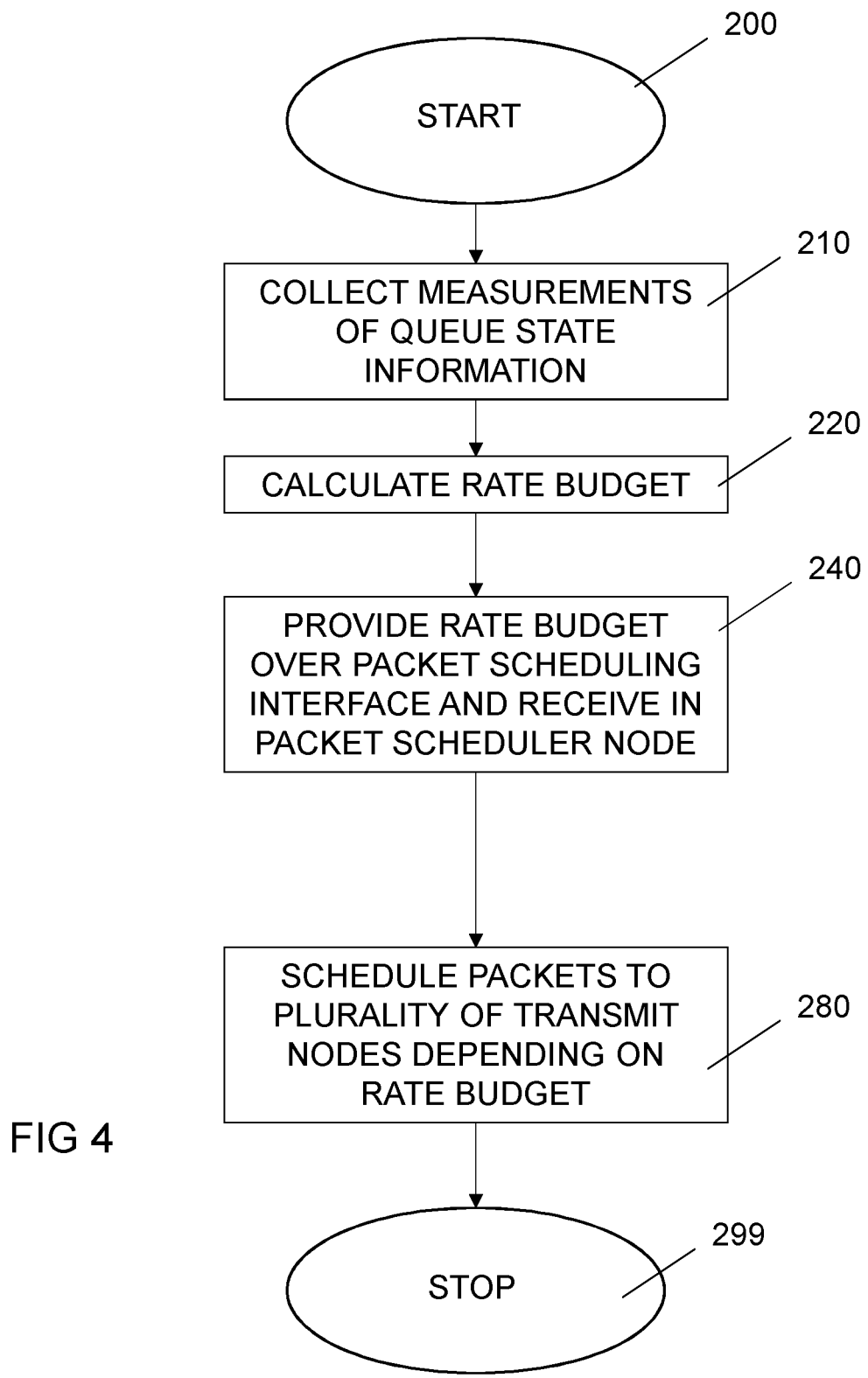
FIG. 4 is a flow diagram of steps of an embodiment of a method for multi-path packet scheduling in a wireless communication system.

FIG. 4 is a schematic flow diagram illustrating an embodiment of a method for multi-path packet scheduling in a wireless communication system. The process starts in step 200. In step 210, measurements of queue state information about buffers of a plurality of transmit nodes, are collected. In step 220, in a packet-flow controller node, a rate budget is calculated based on the collected measurements of queue state information. The rate budget comprises commanded bit rates and/or data volumes for each transmit node for a subsequent sampling period. In step 240, data representative for the rate budget is provided from the packet-flow controller node over a packet scheduling interface and received in a packet scheduler node. In step 280, packets to be sent to each of said plurality of transmit nodes in a subsequent sampling period, are, in the packet scheduler node, scheduled depending on the received rate budget. The process ends in step 299.

Such a total method can also be interpreted as two connected methods, one basically performed in the packet flow controller node and one performed in the packet scheduler node. These methods are interconnected by the rate budget exchanged via the packet scheduling interface.

Figure 5:
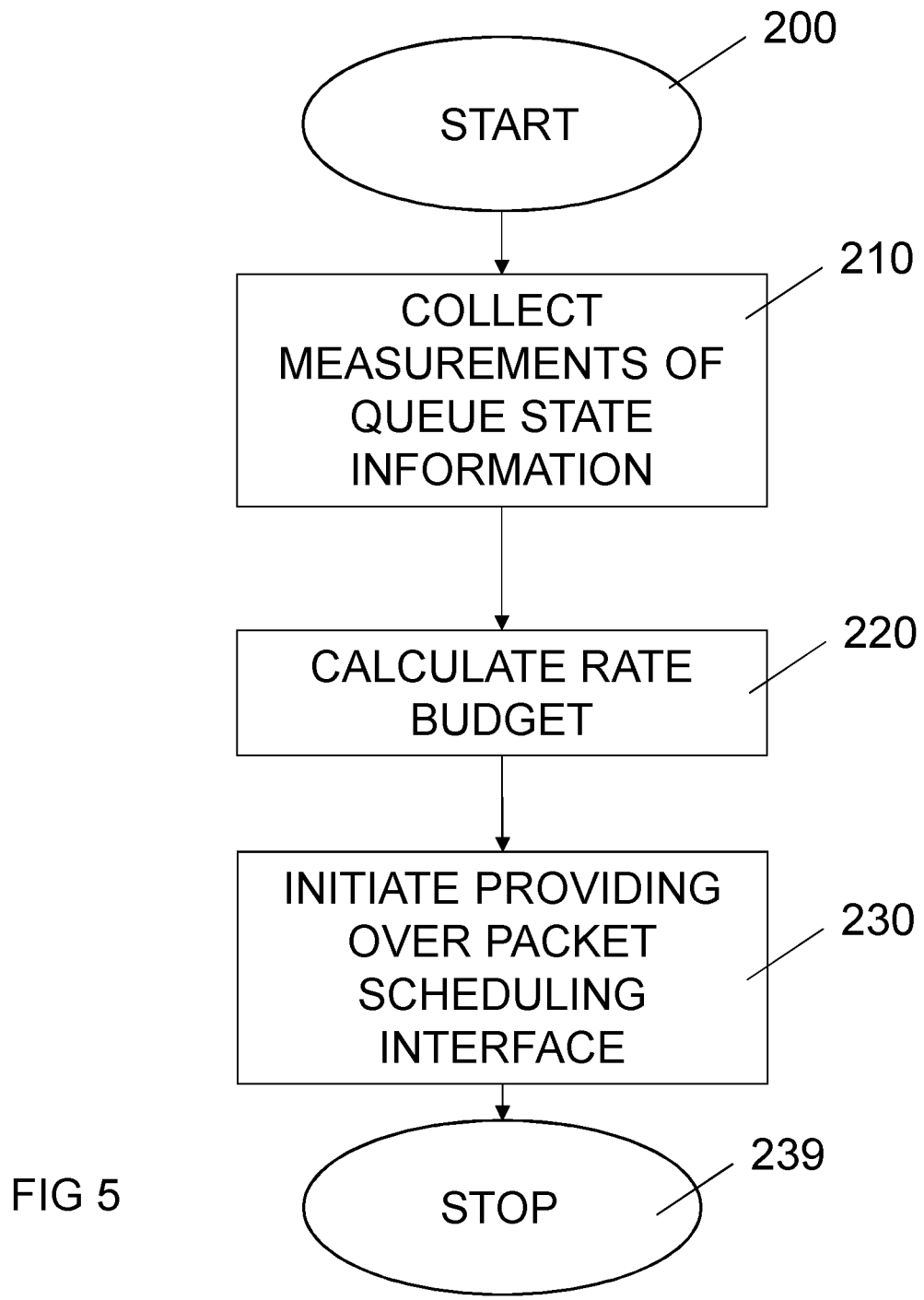
FIG. 5 is a flow diagram of steps of an embodiment of a method for assisting in multi-path packet scheduling in a wireless communication system.

FIG. 5 is a schematic flow diagram illustrating an embodiment of a method for assisting multi-path packet scheduling in a wireless communication system. The process starts in step 200. In step 210, measurements of queue state information about buffers of a plurality of transmit nodes are collected. The actual measurements are not necessarily performed by the same node as performing the calculation, described below. However, information, individual or assembled has to be collected. In a preferred embodiment, the collection of measurements of queue state information is performed with a constant sampling rate. Also in a preferred embodiment, the queue state information comprises data volume, packet dwell time and/or a latest acknowledged packet sequence number.

In step 220, a rate budget, is, in a packet-flow controller node, calculated based on the collected measurements of queue state information. The rate budget comprises commanded bit rates and/or data volumes for each transmit node for a subsequent sampling period. In step 230, providing of data representative for the rate budget from the packet-flow controller node over a packet scheduling interface to a packet scheduler node is initiated, for enabling scheduling of packets to be sent to each of the plurality of transmit nodes in a subsequent sampling period depending on the rate budget. The procedure ends in step 239.

Figure 6:
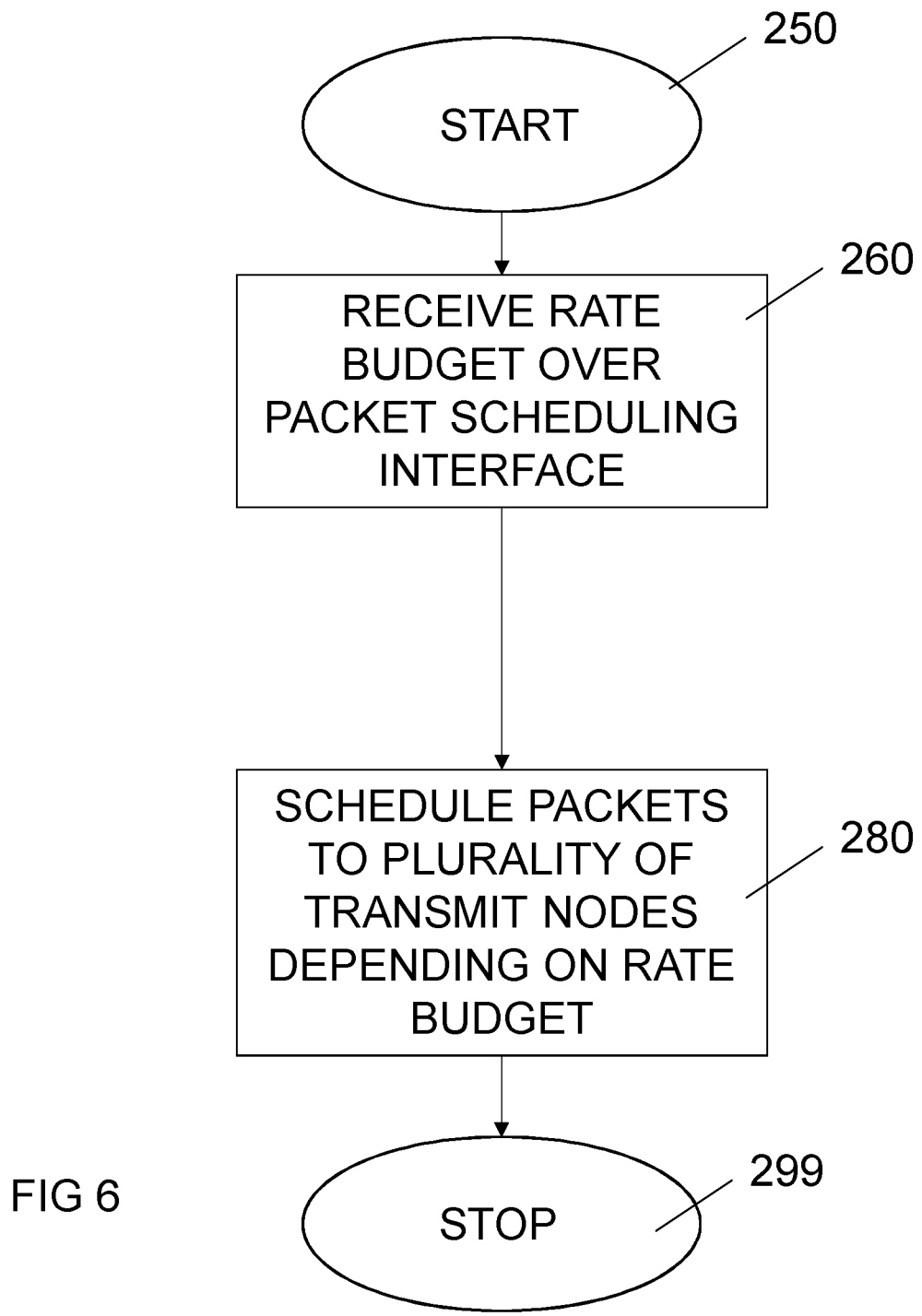
FIG. 6 is a flow diagram of steps of an embodiment of a method for multi-path packet scheduling in a wireless communication system.

FIG. 6 is a schematic flow diagram illustrating an embodiment of a method for multi-path packet scheduling in a wireless communication system. The procedure starts in step 250. In step 260, in a packet scheduler node, data representative for a rate budget is receiving over a packet scheduling interface. The rate budget comprises commanded bit rates and/or data volumes for each transmit node for a subsequent sampling period. In a preferred embodiment, the rate budget is received with a constant sampling rate. In a preferred embodiment, the rate budget is deduced by calculating a rate budget based on collected measurements of queue state information about buffers of the plurality of transmit nodes. In a further preferred embodiment, the queue state information comprises data volume, packet dwell time and/or a latest acknowledged packet sequence number.

In step 280, in the packet scheduler node, packets to be sent to each of a plurality of transmit nodes in a subsequent sampling period are scheduled depending on the received rate budget. The procedure ends in step 299.

The inner loops of the packet flow controller node produce commanded bit rates and/or data volumes, to be used during the next sampling period, for each packet path.

As mentioned further above, the rate budget is calculated based on collected measurements of queue state information. This calculation can be performed in different ways. The details of such a calculation is not of particular importance for the following procedures, as long as it provides a rate budget for a subsequent sampling period.

However, in a preferred embodiment, the calculation of the rate budget is based on feedback of estimated time skews. To this end, the step of calculating therefore in such an embodiment in turn comprises estimation of time skews between buffers of the plurality of transmit nodes based on the measurements of queue state information. Furthermore, the rate budget becomes derived based on that estimated time skews.

Similarly for the scheduling procedures, rate budget is calculated by estimating time skews between the buffers of the plurality of transmit nodes based on the measurements of queue state information and by deriving the rate budget based on the estimated time skews.

One explicit embodiment of a time skew feedback controller is given in Appendix B for completeness and for presenting one example of an enabling description. However, since the details are not any main essential features of the present ideas and many other implementation possibilities are available for the person skilled in the art, the main ideas of the present disclosure should not be limited by the description of Appendix B.

This computation of bit rates or data volumes is a part of the rate budget calculator 42, also denoted as a packet scheduler information calculation block, of the packet flow controller node 40 in FIG. 3. The packet scheduling interface information typically consists of:

$u_i(t)=r_i$, i=1, . . . , n—the bit rate to be used for packet path i, during time $t \in [t_{start}, t_{start}+T_s]$, where $T_s$ denotes the sampling period, or $u_i(t)=d_i=T_s r_i$, i=1, . . . , n—the data volume to be used for packet path i, during time $t \in [t_{start}, t_{start}+T_s]$, where $T_s$ denotes the sampling period, or any combination of the two.

The introduction of the packet scheduling interface allows the packet scheduler process to be located in another node than the packet flow control process. The packet scheduler process can thereby select the path of individual packets independently of the packet flow control process, as long as the rate or bit budgets over each packet path is followed. This means that the packet scheduler node and the packet flow controller node are decoupled. The packet scheduler node is e.g. completely free to duplicate and send packets over different paths to achieve a diversity gain, without notifying the packet flow controller node.

The packet scheduler algorithm or process is characterized by the fact that whenever there are packets to send, it schedules these so that the bit rates and/or the data volumes for each path, as received in the latest packet scheduler information message (see FIG. 3) is fulfilled.

In one embodiment, in case there are more packets available than what can be sent over all packet paths, given the received packet scheduler information, the packet scheduler may leave the remaining packets for packet scheduling the next sampling period, discard the packets, or handle the situation by other means. In other words, the scheduling comprises scheduling, if there are more packets available for sending than what can be sent over all the transmit nodes together in a subsequent sampling period according to the received rate budget, packets to be sent to each of a plurality of transmit nodes in a subsequent sampling period according to the received rate budget. The scheduling comprises at least one of saving packets, not being scheduled in a current sampling period, for a subsequent sampling period and discarding packets, not being scheduled in a current sampling period.

In case there are not enough packets available to meet the bit rate or data volumes received in the packet scheduler information, the packet scheduler algorithm proceeds by scheduling packets so that the bit rates and data volumes specified in the packet scheduler information is not exceeded for any packet path.

In one embodiment, packets are scheduled proportionally, so that all packet paths are filled to within the same fraction (less than 1), with respect to the received packet scheduler information. In other words, the scheduling comprises scheduling, if there are less packets available for sending than what can be sent over all said transmit nodes together in a subsequent sampling period according to the received rate budget, packets to be sent to each of a plurality of transmit nodes in a subsequent sampling period proportionally to the commanded bit rates and data volumes for each transmit node.

In one embodiment, packets are scheduled over the packet paths with least delay, so that a number of packets paths are filled to the extent specified by the packet scheduler information, one to a fraction less than or equal to 1, and some paths not being scheduled. In other words, the scheduling comprises scheduling, if there are less packets available for sending than what can be sent over all the transmit nodes together in a subsequent sampling period according to the received rate budget, packets to transmit nodes with least delay and with a bit rate and data volume not exceeding the commanded bit rates and data volumes for each transmit node.

In one embodiment, packets are duplicated, so that the total number of packets that can be scheduled is at least as large as specified by the packet scheduler information. The packets can then be scheduled according to the case where there are more packets in the packet scheduler queue than can be scheduled during the next sampling period. In other words, the scheduling comprises, if there are less packets available for sending than what can be sent over all said transmit nodes together in a subsequent sampling period according to said received rate budget, duplicating packets until the packets available for sending becomes at most equal to what can be sent over all the transmit nodes together in a subsequent sampling period according to the received rate budget, and scheduling packets to be sent to each of a plurality of transmit nodes in a subsequent sampling period according to the received said rate budget.

It is stressed that the packet scheduler process or algorithm is free to choose the packet path to send a specific packet on. The packet scheduler is also free to duplicate packets if it decides so.

Figure 8:
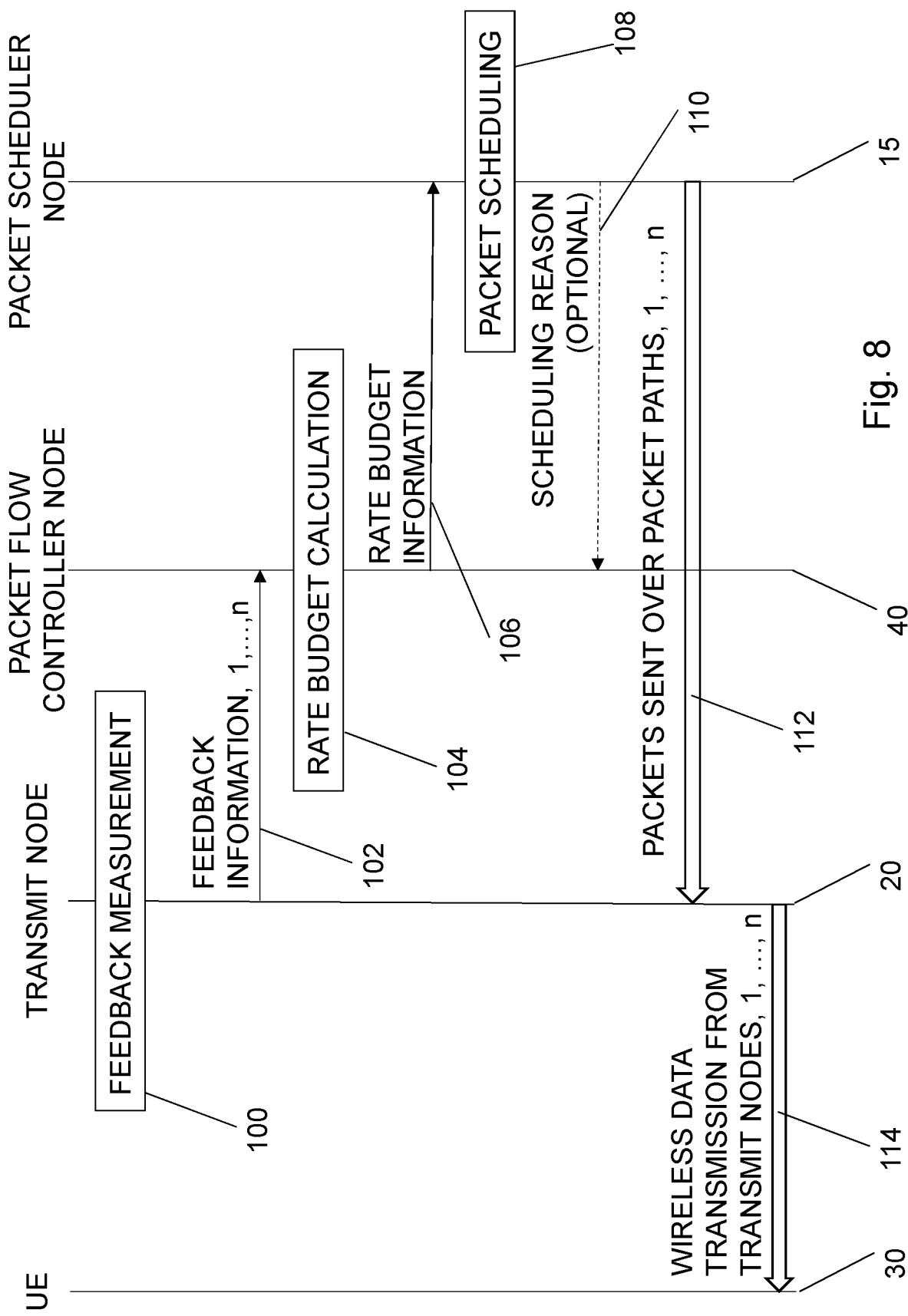
FIG. 8 illustrates an embodiment of a signaling procedure for multi-path packet scheduling in a wireless communication system.

FIG. 8 illustrates an embodiment of a signaling procedure. Feedback measurements 100 are performed, typically at the transmit nodes 20. Information about such feedback measurements for all the transmit nodes 20 are provided 102 to the packet flow controller node 40. In the packet flow controller node 40 a rate budget calculation 104 is performed based on the obtained feedback measurements. Rate budget information is provided 106 over the packet scheduling interface from the packet flow controller node 40 to the packet scheduler node 15. A packet scheduling 108 is performed at the packet scheduler node 15. Packets to the different paths, 1, . . . , n are transferred 112 to the respective transmit nodes 20. Finally, the different transmit nodes 20, 1, . . . , n, transmits 114 the data wirelessly to the UE 30 over the different radio interfaces.

In one embodiment, optionally, in case there are not enough packets available in the packet scheduler queue to meet the specification obtained from the rate budget information, the packet scheduler node 15 may signal 110 this fact together with an indicator of the packet scheduler algorithm strategy to handle the situation to the packet flow controller node 40. This information can be used for so called feedforward, to improve the control performance.

In other words, the method for multi-path packet scheduling in a wireless communication system may further comprise creating, in the packet scheduler node, a scheduling reason indicating that there are not enough packets available in the packet scheduler node. The method further comprises initiating transferring of the scheduling reason from the packet scheduler node over the packet scheduling interface. In a further preferred embodiment, the scheduling reason further comprises an indicator of a packet scheduler algorithm strategy to handle the situation.

Analogously, on the packet flow controller node side, the method for assisting multi-path packet scheduling in a wireless communication system further comprises receiving, in the packet-flow controller node, from a packet scheduler node over the packet scheduling interface, a scheduling reason indicating that there are not enough packets available in the packet scheduler node. The step of calculating the rate budget is then performed in dependence of the received scheduling reason. In a further preferred embodiment, the scheduling reason further comprises an indicator of a packet scheduler algorithm strategy used to handle the situation.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a packet-flow controller node configured to assist scheduling of packets in multi-paths in a wireless communication system. The packet-flow controller node is configured to collect measurements of queue state information about buffers of a plurality of transmit nodes and to calculate a rate budget based on the collected measurements of queue state information. The rate budget comprises commanded bit rates and/or data volumes for each transmit node for a subsequent sampling period. The packet-flow controller node is further configured to initiate providing of data representative for the rate budget from the packet-flow controller node over a packet scheduling interface to a packet scheduler node for enabling scheduling of packets to be sent to each of the plurality of transmit nodes in a subsequent sampling period depending on said rate budget.

According to another aspect of the proposed technology there is provided a packet scheduler node configured to schedule packets in multi-paths in a wireless communication system. The packet scheduler node is configured to receive data representative for a rate budget over a packet scheduling interface and to schedule packets to be sent to each of a plurality of transmit nodes in a subsequent sampling period depending on the received rate budget. The rate budget comprises commanded bit rates and/or data volumes for each transmit node for a subsequent sampling period.

According to yet another aspect of the proposed technology there is provided a wireless communication system comprising a packet-flow controller node according to the aspect here above, a packet scheduler node according to the other aspect here above and a packet scheduling interface connecting the packet-flow controller node and the packet scheduler node.

Figure 9:
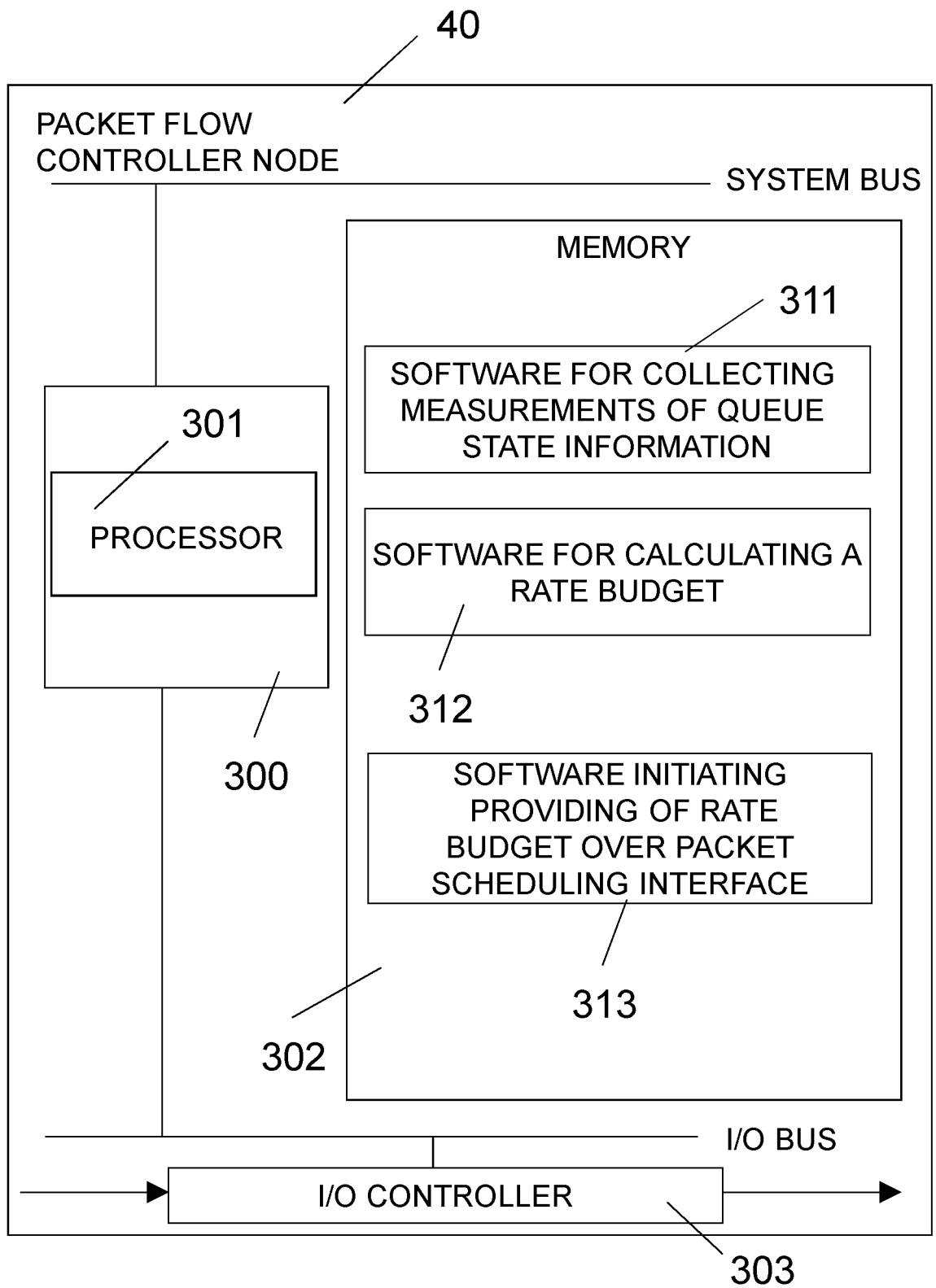
FIG. 9 is block diagram of an embodiment of a packet-flow controller node.

FIG. 9 is a schematic block diagram illustrating an example of a packet flow controller node 40, based on a processor-memory implementation according to an embodiment. In this particular example, the packet flow controller node comprises a processing unit 300, having at least one processor 301, and a memory 302. The memory 302 comprises instructions 311-313 executable by the processor(s) 301, whereby the processor(s) 301 is operative to calculate said rate budget based on said collected measurements of queue state information.

In this embodiment, the memory 302 comprises software 311 for collecting measurements of queue state information, software 312 for calculating a rate budget and software 313 for initiating providing of information representing the rate budget over the packet scheduling interface.

The packet flow controller node 40 also includes a communication circuit 303. The communication circuit 303 may include functions for wired and/or wireless communication with other devices and/or network nodes in the network. In a particular example, the communication circuit 303 may be based on radio circuitry for communication with one or more other nodes, including transmitting and/or receiving information. The communication circuit 303 may be interconnected to the processor unit 300 and/or memory 302 by an I/O bus. By way of example, the communication circuit 303 may include any of the following: a receiver, a transmitter, a transceiver, input/output (I/O) circuitry, input port(s) and/or output port(s). The packet flow controller node 40 comprises communication circuitry configured to collect measurements of queue state information about buffers of a plurality of transmit nodes and to initiate transferring of the rate budget from the packet-flow controller node over a packet scheduling interface.

The packet flow controller node may in other embodiments be based on a hardware circuitry implementation. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

The packet flow controller node may in yet other embodiments be based on a combination of both processor(s) and hardware circuitry in connection with suitable memory unit(s). The packet scheduler node comprises one or more processors, memory including storage for software and data, and one or more units of hardware circuitry such as ASICs and/or FPGAs. The overall functionality is thus partitioned between programmed software (SW) for execution on one or more processors, and one or more pre-configured or possibly reconfigurable hardware circuits such as ASICs and/or FPGAs. The actual hardware-software partitioning can be decided by a system designer based on a number of factors including processing speed, cost of implementation and other requirements.

Figure 10:
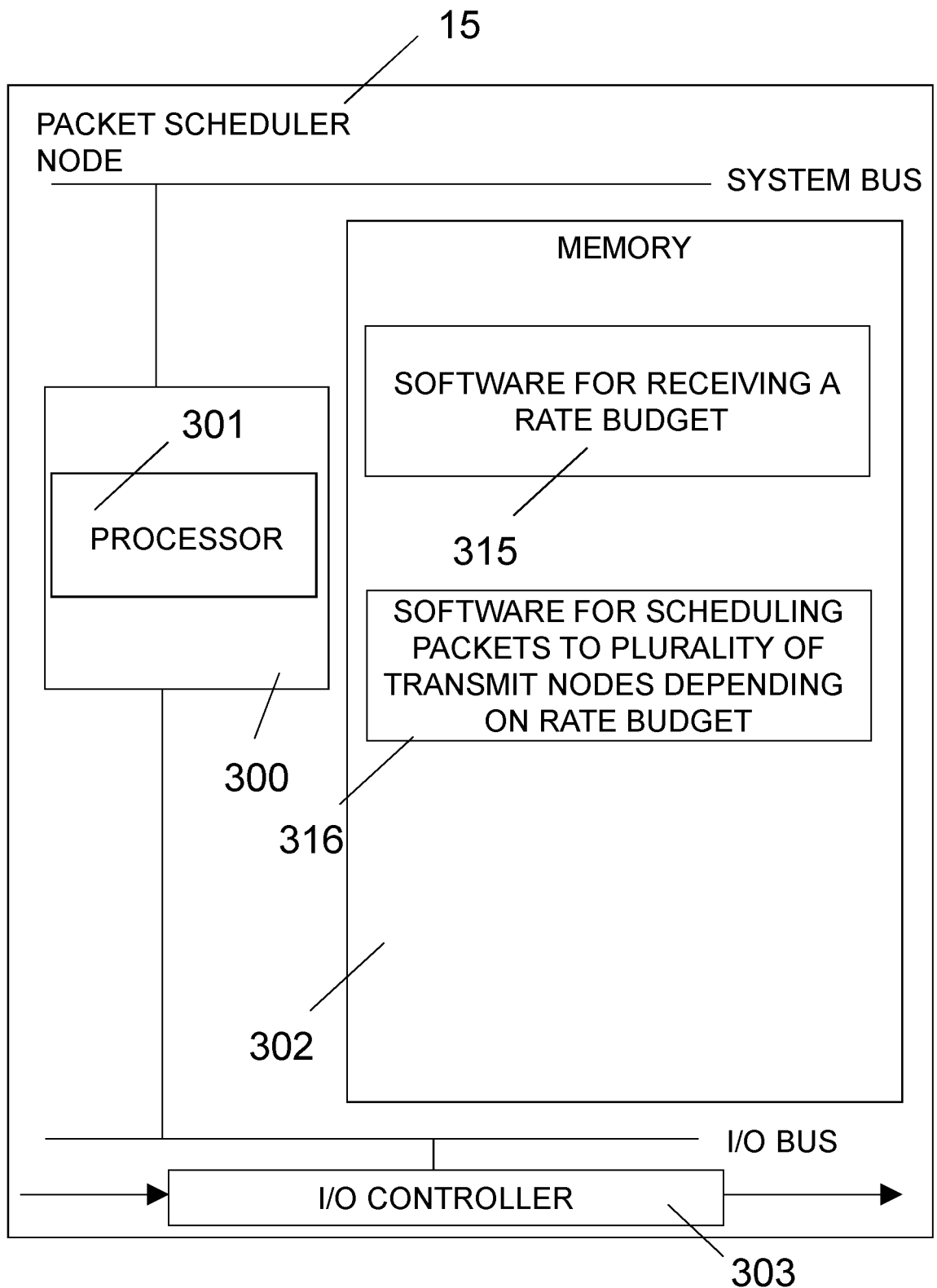
FIG. 10 is block diagram of an embodiment of a packet scheduler node.

FIG. 10 is a schematic block diagram illustrating an example of a packet scheduler node 15, based on a processor-memory implementation according to an embodiment. In this particular example, the packet scheduler node 15 comprises a processing unit 300, having at least one processor 301, and a memory 302. The memory 302 comprises instructions 315-316 executable by the processor(s) 301, whereby the processor(s) 301 is operative to schedule packets to be sent to each of the plurality of transmit nodes in a subsequent sampling period depending on he received rate budget.

In this embodiment, the memory 302 comprises software 315 for receiving a rate budget and software 316 for scheduling of packets to a plurality of transmit nodes in a subsequent sampling period, depending on the rate budget.

The packet scheduler node 15 also includes a communication circuit 303. The communication circuit 303 may include functions for wired and/or wireless communication with other devices and/or network nodes in the network. In a particular example, the communication circuit 303 may be based on radio circuitry for communication with one or more other nodes, including transmitting and/or receiving information. The communication circuit 303 may be interconnected to the processor unit 300 and/or memory 302 by an I/O bus. By way of example, the communication circuit 303 may include any of the following: a receiver, a transmitter, a transceiver, input/output (I/O) circuitry, input port(s) and/or output port(s). The communication circuit 303 is configured to receive the rate budget over the packet scheduling interface.

The packet scheduler node may in other embodiments be based on a hardware circuitry implementation. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

The packet scheduler node may in yet other embodiments be based on a combination of both processor(s) and hardware circuitry in connection with suitable memory unit(s). The packet scheduler node comprises one or more processors, memory including storage for software and data, and one or more units of hardware circuitry such as ASICs and/or FPGAs. The overall functionality is thus partitioned between programmed software (SW) for execution on one or more processors, and one or more pre-configured or possibly reconfigurable hardware circuits such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

In a computer-implementation, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, a computer program comprises instructions, which when executed by at least one processor, cause the processor(s) to collect measurements of queue state information about buffers of a plurality of transmit nodes. The computer program further comprises instructions, which when executed by the processor(s), cause the processor(s) to calculate a rate budget based on said collected measurements of queue state information. The rate budget comprises commanded bit rates and/or data volumes for each transmit node for a subsequent sampling period. The computer program further comprises instructions, which when executed by the processor(s), cause the processor(s) to initiate providing of data representative for the rate budget from the packet-flow controller node over a packet scheduling interface to a packet scheduler node for enabling scheduling of packets to be sent to each of the plurality of transmit nodes in a subsequent sampling period depending on the rate budget.

Analogously, in another particular embodiment, a computer program comprising instructions, which when executed by at least one processor, cause the processor(s) to receive data representative for a rate budget over a packet scheduling interface. The rate budget comprises commanded bit rates and/or data volumes for each transmit node for a subsequent sampling period. The computer program further comprises instructions, which when executed by the processor(s), cause the processor(s) to schedule packets to be sent to each of a plurality of transmit nodes in a subsequent sampling period depending on the received rate budget.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

A network device, comprising a packet node scheduler and/or a packet flow controller node may be any suitable network device in the wireless communication system, or a network device in connection with the wireless communication system. By way of example, the network device may be a suitable network node such a base station or an access point. However, the network device may alternatively be a cloud-implemented network device.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often be desirable to centralize functionality in so-called generic data centers, in other scenarios it may in fact be beneficial to distribute functionality over different parts of the network.

Figure 11:
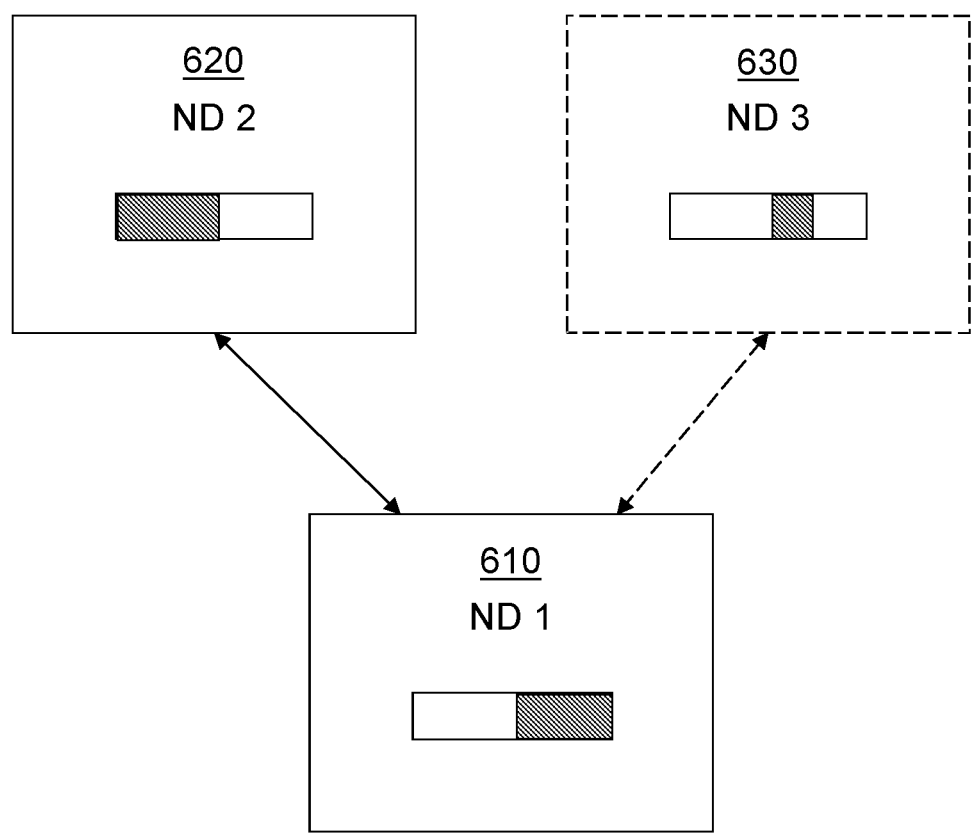
FIG. 11 is a block diagram illustrating how functionality can be distributed or partitioned between different network devices in a cloud implementation.

FIG. 11 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 12:
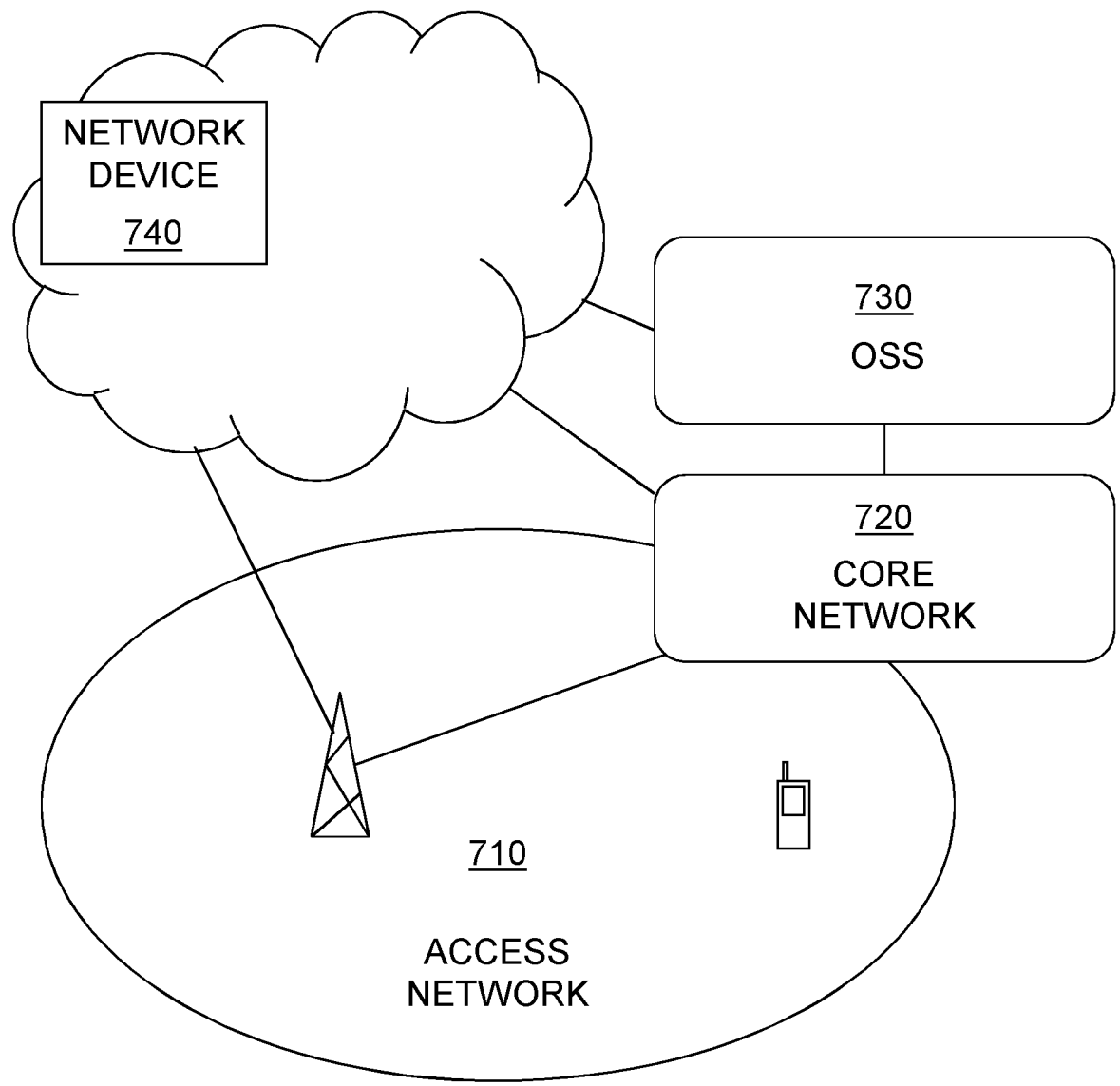
FIG. 12 is a schematic diagram illustrating an example of a wireless communication system with a cloud implementation.

FIG. 12 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 13:
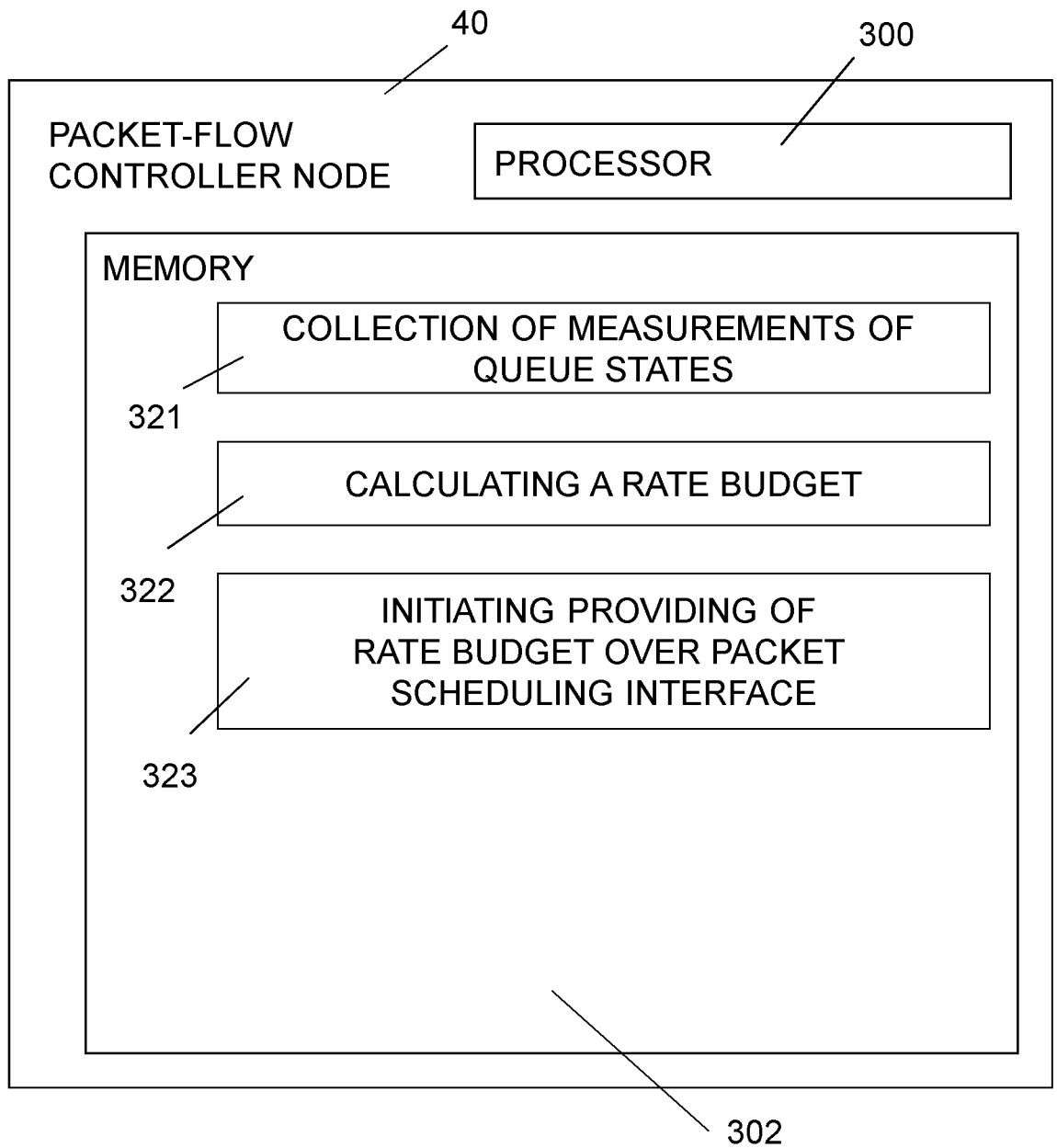
FIG. 13 is block diagram of an embodiment of a packet-flow controller node.

FIG. 13 is a schematic diagram illustrating an example of a packet-flow controller node 40 for assisting in scheduling of packets in multi-paths in a wireless communication system. The packet-flow controller node 40 comprises a processor 300 and a memory 302 in which function modules are provided. The packet-flow controller node 40 comprises a collecting module 321 for collection of measurements of queue state information about buffers of a plurality of transmit nodes. The packet-flow controller node 40 further comprises a calculator 322 for calculating a rate budget based on the collected measurements of queue state information. The rate budget comprises commanded bit rates and/or data volumes for each transmit node for a subsequent sampling period. The packet-flow controller node 40 further comprises a transmitter 323 for initiating providing of data representative for the rate budget from the packet-flow controller node over a packet scheduling interface to a packet scheduler node for enabling scheduling of packets to be sent to each of the plurality of transmit nodes in a subsequent sampling period depending on the rate budget.

Figure 14:
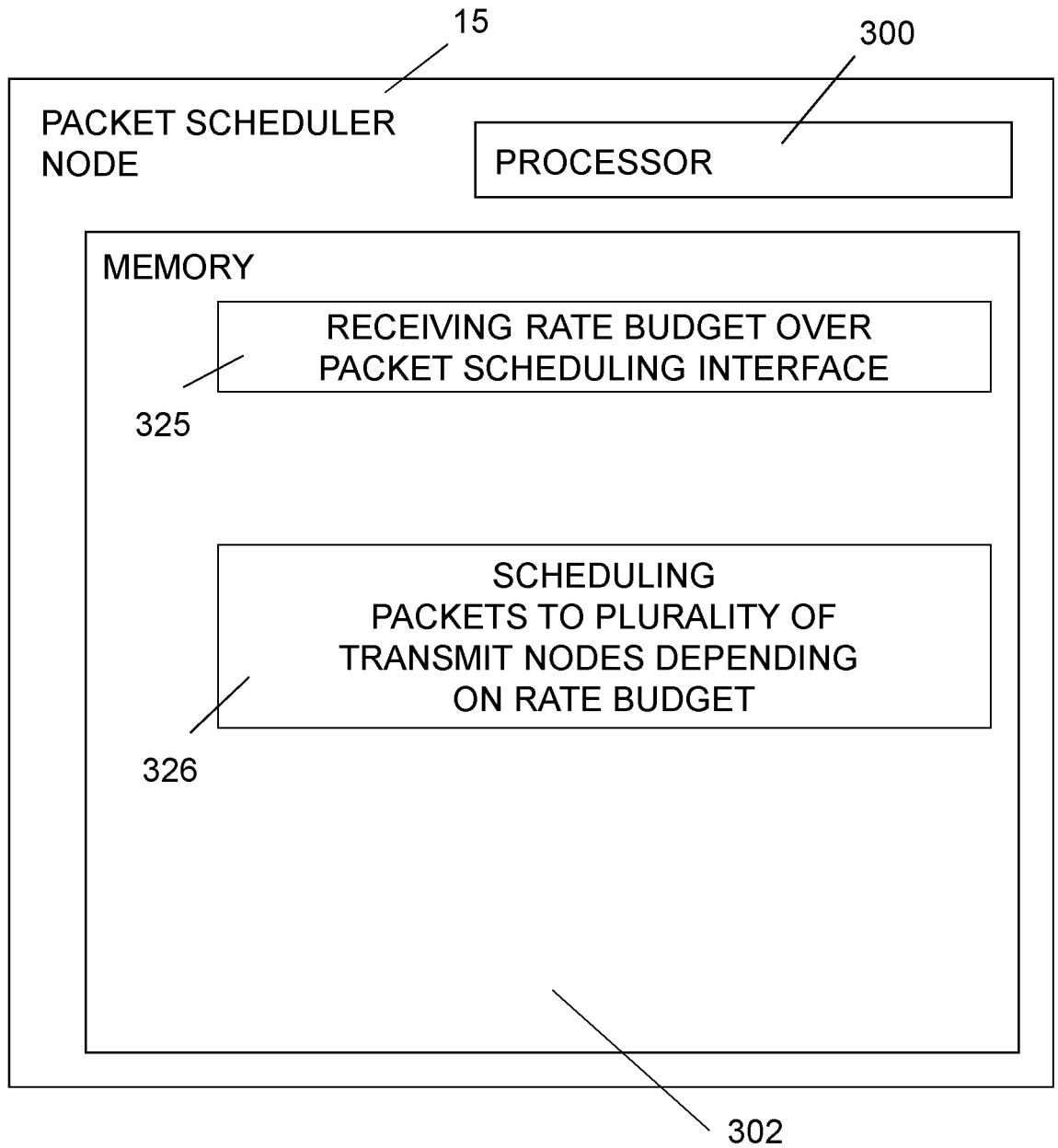
FIG. 14 is block diagram of an embodiment of a packet scheduler node.

FIG. 14 is a schematic diagram illustrating an example of a packet scheduler node 15 for scheduling packets in multi-paths in a wireless communication system. The packet scheduler node 15 comprises a processor 300 and a memory 302 in which function modules are provided. The packet scheduler node 15 comprises a receiver 325 for receiving data representative for a rate budget over a packet scheduling interface. The rate budget comprises commanded bit rates and/or data volumes for each transmit node for a subsequent sampling period. The packet scheduler node 15 further comprises a scheduling module for scheduling packets to be sent to each of a plurality of transmit nodes in a subsequent sampling period depending on the received rate budget.

One embodiment of a wireless communication system comprises a packet-flow controller node 40 according to FIG. 13, a packet scheduler node 15 according to FIG. 14 and a packet scheduling interface connecting the packet-flow controller node and the packet scheduler node.

Alternatively it is possible to realize the module(s) in FIGS. 13 and 14 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

Abbreviations

4G Fourth Generation cellular systems
5G Fifth Generation cellular systems
ASIC Application Specific Integrated Circuits
BTS Base Transceiver Stations
CD Compact Disc
CN Core Network
COTS Common Off-The-Shelf
CPE Customer Premises Equipment
CPU Central Processing Units
DSP Digital Signal Processors
DVD Digital Versatile Disc
eNB evolved Node B
FPGA Field Programmable Gate Arrays
HDD Hard Disk Drive
HW hardware
I/O input/output
LEE Laptop Embedded Equipment
LME Laptop Mounted Equipment
LTE Long Term Evolution
MEM memory units
ND Network Device
NFV Network Function Virtualization
NI Network Interfaces
NIC Network Interface Controller
NR Next generation Radio
OS Operating System
OSS Operations and Support System
PC Personal Computer
PDA Personal Digital Assistant
PLC Programmable Logic Controllers
RAM Random Access Memory
RAN Radio Access Network
RBS Radio Base Station
REG registers
RNC Radio Network Controller
ROM Read-Only Memory
RRU Remote Radio Units
STA Station
SW software
TCP Transmission Control Protocol
UE User Equipment
USB Universal Serial Bus
VM Virtual Machine
VMM Virtual Machine Monitor
VNE Virtual Network Element
WCDMA Wideband Code Division Multiple Access
WNIC Wireless Network Interface Controller

APPENDIX A

Automatic Control Terminology

As a start, a number of representations of a dynamic process need to be introduced. A dynamic process is one where the output depends not only on the present input signal but also of previous inputs and outputs. Put otherwise, the dynamic process has memory. The most basic dynamic process is the linear one that can be described by a differential equation as:

$$y^{(n)}(t)+a_1 y^{(n-1)}+ \ldots +a_n y(t)=b_0 u^{(n)}(t)++ \ldots b_n u(t). \quad (A1)$$

Here y(t) is the output signal, u(t) is the input signal, t is the time, while a, =1 . . . n and $b_j$ j=0, . . . , m are constant parameters. (i) denotes differentiation wrt time i times. The above differential equation has order n. It has one input signal and one output signal. For simplicity all concepts are explained in this context, but the generalization to more than one input signal and more than one input signal is available in prior art textbooks.

By taking Laplace transforms and setting initial values to zero, the differential equation is transformed to be represented by a transfer function H(s), where s denotes the Laplace transform variable which is closely related to the angular frequency used in Fourier transforms. The result is:

$$H(s) = \frac{B(s)}{A(s)} = \frac{b_0 s^m + b_1 s^{m-1} + \ldots + b_m}{s^n + a_1 s^{n-1} + \ldots + a_n}. \quad (A2)$$

The relation between the output signal and input signal Laplace transforms Y(s) and U(s) are:

$$Y(s) = H(s)U(s). \quad (A3)$$

The poles $p_i$, i=1, . . . , n of the process are given by the equation A(s)=0. For simplicity only strictly stable (open loop) processes with all poles in the left complex half plane is considered here. In general poles are real or complex conjugate pairs.

The properties of the dynamic process can also be studied in the frequency domain in terms of complex valued frequency functions Y(jω), H(jω) and U(jω). ω denotes the angular frequency that fulfils:

$$\omega = 2\pi f, \quad (A4)$$

where f is the frequency in Hz. Below, frequency is used for angular frequency.

Figure 2:
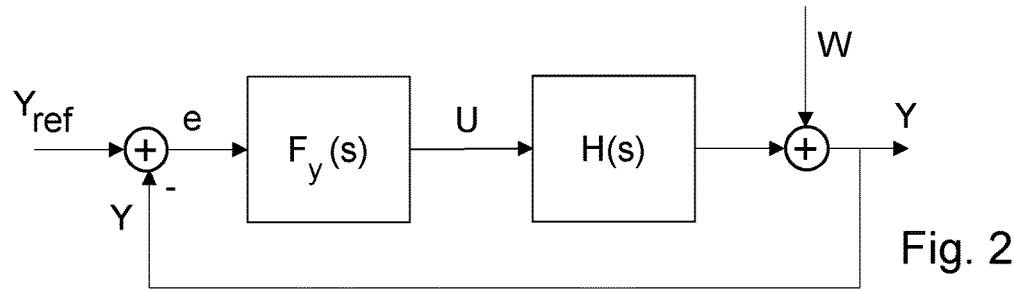
FIG. 2 is a block diagram of a feedback principle.

Finally, the concept of feedback is illustrated by FIG. 2, where $F_y(s)$ is the feedback gain. The closed loop system is then computed as follows:

$$Y(s) = W(s) + H(s)F_y(s)(Y_{ref}(s) - Y(s)) \quad (A5)$$

which gives:

$$Y(s) = \frac{F_y(s)H(s)}{1 + F_y(s)H(s)} Y_{ref}(s) + \frac{1}{1 + F_y(s)H(s)} W(s). \quad (A6)$$

This gives the effect of the reference signal and the disturbance on the output.

e denotes control error.

APPENDIX B

An Example of a Time Skew Feedback Controller

This time skew packet flow controller is included here only for reference to give an example of how the information sent over the interface is generated.

A time skew packet flow feedback loop is described for the case with 2 transmit points, and for one bearer. The generalization to more than 1 bearer is trivial since this generalization is obtained by setting up another instance of the functionality described below. In this context, a bearer may be thought of as supporting a flow of data packets belonging to an IP connection.

Figure 7:
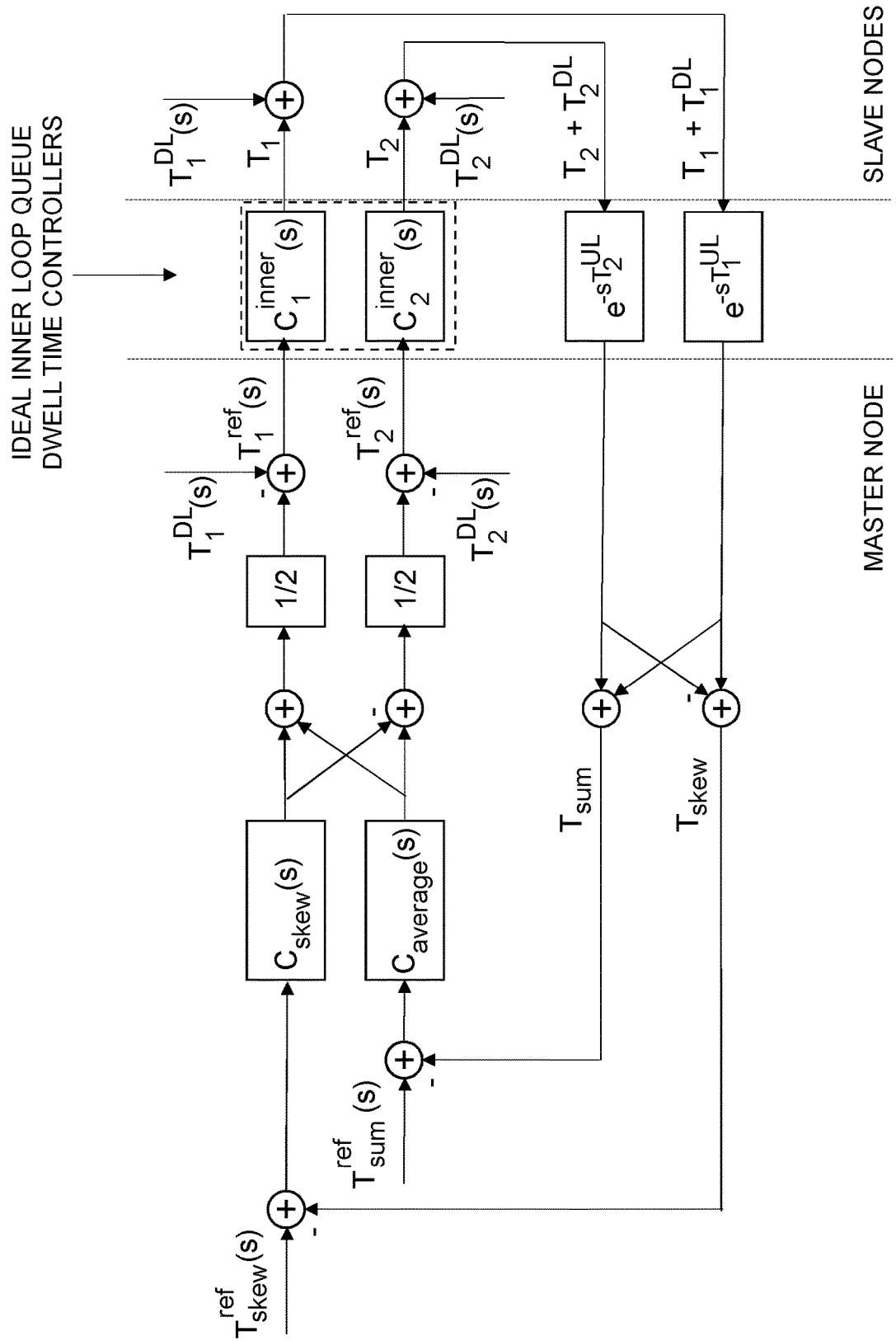
FIG. 7 is a block diagram illustrating an example of a time skew packet flow feedback loop.

The feedback loop is depicted in FIG. 7. The components of that figure can be explained as follows.

$T_{skew}^{ref}(s)$ is the Laplace transform of the reference value for the time skew, typically 0.

$T_{sum}^{ref}(s)$ is the Laplace transform of the reference value for the sum of downlink time delays.

$C_{skew}(s)$ is the transfer function of the feedback controller for the time skew control channel.

$C_{sum}(s)$ is the transfer function of the feedback controller for the delay sum channel.

$T_i^{DL}(s)$ is the Laplace transform of the backhaul delay for the channel to slave node i, i=1,2.

$T_i^{ref}(s)$ is the Laplace transform of the reference value for the inner feedback control loop for slave node i, i=1,2.

$G_i^{inner}(s)$ is the transfer function used for modelling of the inner closed loop controller dynamics for slave node i, i=1,2.

$T_i(s)$ is the Laplace transform of the delay of the queue of slave node i, as controlled by the inner loop controller, i=1,2

$T_i^{UL}$ is the delay of the UL feedback signaling from slave node i, i=1,2.

$e^{-sT_i^{UL}}$ is the Laplace transform of the effect of the delay of the UL feedback signaling from slave node i, i=1,2

$T_{skew}(s)$ is the Laplace transform of the time skew signal.

$T_{sum}(s)$ is the Laplace transform of the signal describing the sum of downlink time delays.

To describe the controller, it is noted that the slave nodes are nodes that perform the wireless interface transmission and that get their transmit data from transmit queues, typically 1 queue for each "bearer", where a bearer may be thought of as an IP connection between the source and the end user. The reason why the slave nodes need queues is that the radio channel is subject to rapid fading. Furthermore the interface between the slave nodes and the data source node (the backhaul interface) is subject to delay in both the downlink and the uplink. To ensure that the slave nodes do not run out of data when there is data to transmit upstream, queues are needed for buffering purposes. The queues are typically designed to give a packet dwell time of the order of the sum of the UL and DL backhaul delay.

Each queue in a slave node is controlled by a so called inner loop controller, with the purpose of controlling the dwell time of the queue to follow a desired reference value. In FIG. 7 the reference values for the inner loop controllers are $T_i^{ref}(s)$, i=1,2, while the controlled outputs are $T_i(s)$, i=1,2. The resulting inner loop dynamics are represented by the transfer functions $G_i^{inner}(s)$, i=1,2. They represent the aggregated effect of all features of the inner loop, including effects of so called feed-forward signals. It is stressed that the exact design of the inner loop is not an essential part of the techniques presented here. Different techniques for inner loop flow controller design are available within prior art and can e.g. as such be found in the published international patent application WO 2014/207494 A1 and in the paper "Robust $\mathcal{L}_2$ Stable Networked Control of Wireless Packet Queues in Delayed Internet Connections" by T. Wigren, in IEEE Transactions on control systems technology, Vol. 24, No. 2, March 2016, pp. 502-513. Inner loop control is not discussed further here.

The time skew, i.e. the difference between the total downlink delay between the slave nodes (2 in FIG. 7) are measured against the total downlink delay This quantities is given by the equation:

$$T_{skew}(s) = T_1(s) + T_1^{DL}(s) - T_2(s) - T_2^{DL}(s). \quad (B1)$$

Assuming that the wireless system is synchronized, the downlink backhaul delays $T_1^{DL}(s)$ and $T_2^{DL}(s)$ can be obtained by time stamping of data packets in the DL. The downlink backhaul delays then follow as the difference between the time of arrival of the packet and the piggy backed time stamp provided by the master node, in each slave node. The dwell times of the transmit queues, i.e. $T_1(s)$ and $T_2(s)$ are also readily available in each slave node. The alternatives to measure the dwell time include measurement of the time it takes between a package is entering the transmit queue and when it leaves the queue. Another alternative would be to compute the quotient between the data volume of the queue and the wireless rate. Quotients between averages of the data volume and wireless rate is still another alternative. Hence, the total downlink delay is measured in each slave node. This quantity is then signaled to the master node. The signaling is subject to an uplink signaling delay that needs to be accounted for by the skew controller design process. The master finally forms the signals $T_{skew}(s)$ and $T_{sum}(s)$ by adding and subtracting the total downlink delay signals, obtained from each of the slave nodes. The exact algebraic relations are depicted in the block diagram of FIG. 7. The measurement of time skew and sum of delay therefore involves the following steps:

Measuring backhaul downlink delay, in each involved slave node.

Measuring transmit queue delay (also denoted dwell time), in each involved slave node, for each bearer (there is one transmit queue for each bearer).

Forming and signaling the total downlink delay for each bearer, from each slave node to the master node over the uplink backhaul interface.

Forming the time skew and sum of delay for each bearer, in the master node.

REFERENCES

[1] WO 2014/207494 A1.
[2] T. Wigren, "Robust $\mathcal{L}_2$ Stable Networked Control of Wireless Packet Queues in Delayed Internet Connections", IEEE Transactions on control systems technology, Vol. 24, No. 2, March 2016, pp. 502-513.

The invention claimed is:

1. A method for multi-path packet scheduling in a wireless communication system, wherein the multi-path packet scheduling schedules packets over multiple paths between a packet scheduler node and a plurality of transmit nodes, said method comprising:

collecting measurements of queue state information about buffers of said plurality of transmit nodes;

calculating, in a packet-flow controller node, a rate budget based on said collected measurements of queue state information;

said rate budget comprising at least one of commanded bit rates and data volumes for each transmit node for a subsequent sampling period;

providing data representative for said rate budget from said packet-flow controller node over a packet scheduling interface to the packet scheduler node; and scheduling, in said packet scheduler node, packets to be sent to each of said plurality of transmit nodes in a subsequent sampling period depending on said received rate budget, wherein said calculating said rate budget comprises:

estimating time skews between said buffers of said plurality of transmit nodes based on said measurements of queue state information; and deriving said rate budget based on said estimated time skews.

2. The method according to claim 1, wherein said collection of measurements of queue state information is performed with a constant sampling rate.

3. The method according to claim 1, wherein said queue state information comprises at least one of:
data volume;
packet dwell time; and
a latest acknowledged packet sequence number.

4. The method according to claim 1, further comprising:
receiving, in said packet-flow controller node, from a packet scheduler over said packet scheduling interface, a scheduling reason indicating that there are not enough packets available in said packet scheduler;

wherein said calculating is performed in dependence of said received scheduling reason.

5. The method according to claim 1, wherein said scheduling comprises scheduling, if there are more packets available for sending than what can be sent over all said transmit nodes together in a subsequent sampling period according to said received rate budget, packets to be sent to each of a plurality of transmit nodes in a subsequent sampling period according to said received rate budget.

6. The method according to claim 1, wherein said scheduling comprises scheduling, if there are less packets available for sending than what can be sent over all said transmit nodes together in a subsequent sampling period according to said received rate budget, packets to each of a plurality of transmit nodes in a subsequent sampling period proportionally to said commanded bit rates and data volumes for each transmit node, or scheduling, if there are less packets available for sending than what can be sent over all said transmit nodes together in a subsequent sampling period according to said received rate budget, packets to transmit nodes with least delay and with a bit rate and data volume not exceeding said commanded bit rates and data volumes for each transmit node.

7. The method according to claim 1, wherein said scheduling comprises, if there are less packets available for sending than what can be sent over all said transmit nodes together in a subsequent sampling period according to said received rate budget, duplicating packets until the packets available for sending becomes at most equal to what can be sent over all said transmit nodes together in a subsequent sampling period according to said received rate budget, and scheduling packets to be sent to each of a plurality of transmit nodes in a subsequent sampling period according to said received said rate budget.

8. The method according to claim 1, further comprising:
creating, in said packet scheduler, a scheduling reason indicating that there are not enough packets available in said packet scheduler; and
initiating transferring of said scheduling reason from said packet scheduler over said packet scheduling interface.

9. A method for assisting multi-path packet scheduling in a wireless communication system, wherein the multi-path packet scheduling schedules packets over multiple paths between a packet scheduler node and a plurality of transmit nodes, said method comprising:

collecting measurements of queue state information about buffers of said plurality of transmit nodes;

calculating, in a packet-flow controller node, a rate budget based on said collected measurements of queue state information;

said rate budget comprising at least one of commanded bit rates and data volumes for each transmit node for a subsequent sampling period;

initiating providing of data representative for said rate budget from said packet-flow controller node over a packet scheduling interface to said packet scheduler node for enabling scheduling of packets to be sent to each of said plurality of transmit nodes in a subsequent sampling period depending on said rate budget, wherein said calculating said rate budget comprises:

estimating time skews between said buffers of said plurality of transmit nodes based on said measurements of queue state information; and deriving said rate budget based on said estimated time skews.

10. A method for multi-path packet scheduling in a wireless communication system, wherein the multi-path packet scheduling schedules packets over multiple paths between a packet scheduler node and a plurality of transmit nodes, said method comprising:
- receiving, in the packet scheduler node, data representative for a rate budget over a packet scheduling interface;
- said rate budget comprising at least one of commanded bit rates and data volumes for each transmit node for a subsequent sampling period; and
- scheduling, in said packet scheduler node, based on a number of packets available for sending and a number of packets that can be sent over all transmit nodes together, packets to be sent to each of the plurality of transmit nodes in a subsequent sampling period depending on said received rate budget.

11. A packet-flow controller node configured to assist scheduling of packets in multi-paths between a packet scheduler node and a plurality of transmit nodes in a wireless communication system, comprising:
- one or more processors; and
- a memory comprising instructions executable by the one or more processors to cause said packet-flow controller node to:
- collect measurements of queue state information about buffers of the plurality of transmit nodes;
- calculate a rate budget based on said collected measurements of queue state information;
- said rate budget comprising at least one of commanded bit rates and data volumes for each transmit node for a subsequent sampling period; and
- initiate providing of data representative for said rate budget from said packet-flow controller node over a packet scheduling interface to the packet scheduler node for enabling scheduling of packets to be sent to each of said plurality of transmit nodes in a subsequent sampling period depending on said rate budget, wherein said calculation of said rate budget comprises:
- estimating time skews between said buffers of said plurality of transmit nodes based on said measurements of queue state information; and
- deriving said rate budget based on said estimated time skews.

12. A packet scheduler node configured to schedule packets in multi-paths between the packet scheduler node and a plurality of transmit nodes in a wireless communication system, comprising:
- one or more processors; and
- a memory comprising instructions executable by the one or more processors to cause said packet scheduler node to:
- receive data representative for a rate budget over a packet scheduling interface;
- said rate budget comprising at least one of commanded bit rates and data volumes for each transmit node for a subsequent sampling period; and
- schedule, based on a number of packets available for sending and a number of packets that can be sent over all transmit nodes together, packets to be sent to each of said plurality of transmit nodes in a subsequent sampling period depending on said received rate budget.

13. The packet scheduler node according to claim 12, wherein said one or more processors is operative to schedule packets to be sent to each of said plurality of transmit nodes in a subsequent sampling period depending on said received rate budget.

14. The packet scheduler node according to claim 12, wherein said packet scheduler node comprises communication circuitry configured to receive said rate budget over said packet scheduling interface.

* * * * *